United States Patent
McCann et al.

(10) Patent No.: US 9,703,550 B1
(45) Date of Patent: Jul. 11, 2017

(54) TECHNIQUES FOR BUILDING CODE ENTITIES

(75) Inventors: Peter J. McCann, Mason, NH (US); Christopher M. Gould, Leominster, MA (US); Robert J. Bell, IV, Mont Vernon, NH (US)

(73) Assignee: EMC IP Holding Company LLC, Hopkinton, MA (US)

(*) Notice: Subject to any disclaimer, the term of this patent is extended or adjusted under 35 U.S.C. 154(b) by 1318 days.

(21) Appl. No.: 12/586,845

(22) Filed: Sep. 29, 2009

(51) Int. Cl.
*G06F 9/44* (2006.01)
*G06F 9/445* (2006.01)

(52) U.S. Cl.
CPC ............ *G06F 8/71* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 6,016,394 A * | 1/2000 | Walker | 717/104 |
| 6,223,144 B1 * | 4/2001 | Barnett et al. | 703/22 |
| 6,697,088 B1 * | 2/2004 | Hollander | 715/744 |
| 6,708,290 B2 * | 3/2004 | Swoboda et al. | 714/30 |
| 6,952,825 B1 * | 10/2005 | Cockx et al. | 718/102 |
| 7,380,250 B2 * | 5/2008 | Schechter et al. | 719/328 |
| 7,475,000 B2 * | 1/2009 | Cook et al. | 703/14 |
| 7,882,438 B2 * | 2/2011 | Markham et al. | 715/736 |
| 7,937,496 B2 * | 5/2011 | Kegoya et al. | 709/246 |
| 7,950,022 B1 * | 5/2011 | Gould | G06F 13/102 719/327 |
| 8,312,173 B2 * | 11/2012 | Berg et al. | 709/248 |
| 2002/0035595 A1 * | 3/2002 | Yen | G06F 9/4443 709/203 |
| 2002/0059054 A1 * | 5/2002 | Bade | G06F 17/5022 703/20 |
| 2002/0072893 A1 * | 6/2002 | Wilson | G06F 13/1605 703/26 |
| 2002/0129342 A1 * | 9/2002 | Kil et al. | 717/137 |
| 2002/0133635 A1 * | 9/2002 | Schechter et al. | 709/310 |
| 2002/0184401 A1 * | 12/2002 | Kadel et al. | 709/315 |
| 2002/0199173 A1 * | 12/2002 | Bowen | 717/129 |
| 2003/0058277 A1 * | 3/2003 | Bowman-Amuah | 345/765 |
| 2003/0097639 A1 * | 5/2003 | Niyogi et al. | 715/526 |
| 2004/0172637 A1 * | 9/2004 | Koutyrine | 719/328 |

(Continued)

OTHER PUBLICATIONS

U.S. Appl. No. 12/456,835, filed Jun. 23, 2009, McCann et al.
http://en.wikipedia.org/wiki/Make_(software), "make (software)", Aug. 25, 2009, 5 pages.

*Primary Examiner* — Henry Tsai
*Assistant Examiner* — Christopher Bartels
(74) *Attorney, Agent, or Firm* — Muirhead and Saturnelli, LLC

(57) ABSTRACT

Described are techniques for building a code entity. A plurality of configuration files are selected in accordance with a target and target variant. The target identifies hardware and software platform information about an environment in which the code entity is to be configured for execution. The target variant identifies a software build variation for a particular target. One or more build phases are performed using the plurality of configuration files selected in said selecting. The code entity is generated as an output of performing the one or more build phases where the code entity varies with the target and target variant.

19 Claims, 11 Drawing Sheets

(56) References Cited

U.S. PATENT DOCUMENTS

| | | | |
|---|---|---|---|
| 2004/0268309 A1* | 12/2004 | Grover | G06F 8/20 |
| | | | 717/120 |
| 2005/0102308 A1* | 5/2005 | Sykes et al. | 707/102 |
| 2005/0114355 A1* | 5/2005 | Nuttila | 707/100 |
| 2005/0132356 A1* | 6/2005 | Cross et al. | 717/174 |
| 2005/0166193 A1* | 7/2005 | Smith et al. | 717/143 |
| 2006/0005085 A1* | 1/2006 | Zunino et al. | 714/47 |
| 2006/0047665 A1* | 3/2006 | Neil | 707/10 |
| 2006/0190806 A1* | 8/2006 | Sasson et al. | 715/500 |
| 2008/0082017 A1* | 4/2008 | Savic | 600/529 |
| 2008/0127233 A1* | 5/2008 | Neil et al. | 719/330 |
| 2008/0201453 A1* | 8/2008 | Assenmacher | 709/219 |
| 2008/0201611 A1* | 8/2008 | Bassin et al. | 714/37 |
| 2008/0263506 A1* | 10/2008 | Broadfoot et al. | 717/104 |
| 2008/0300943 A1* | 12/2008 | Simpson | G06Q 10/06 |
| | | | 705/7.23 |
| 2009/0012966 A1* | 1/2009 | Arai | H04L 41/0846 |

* cited by examiner

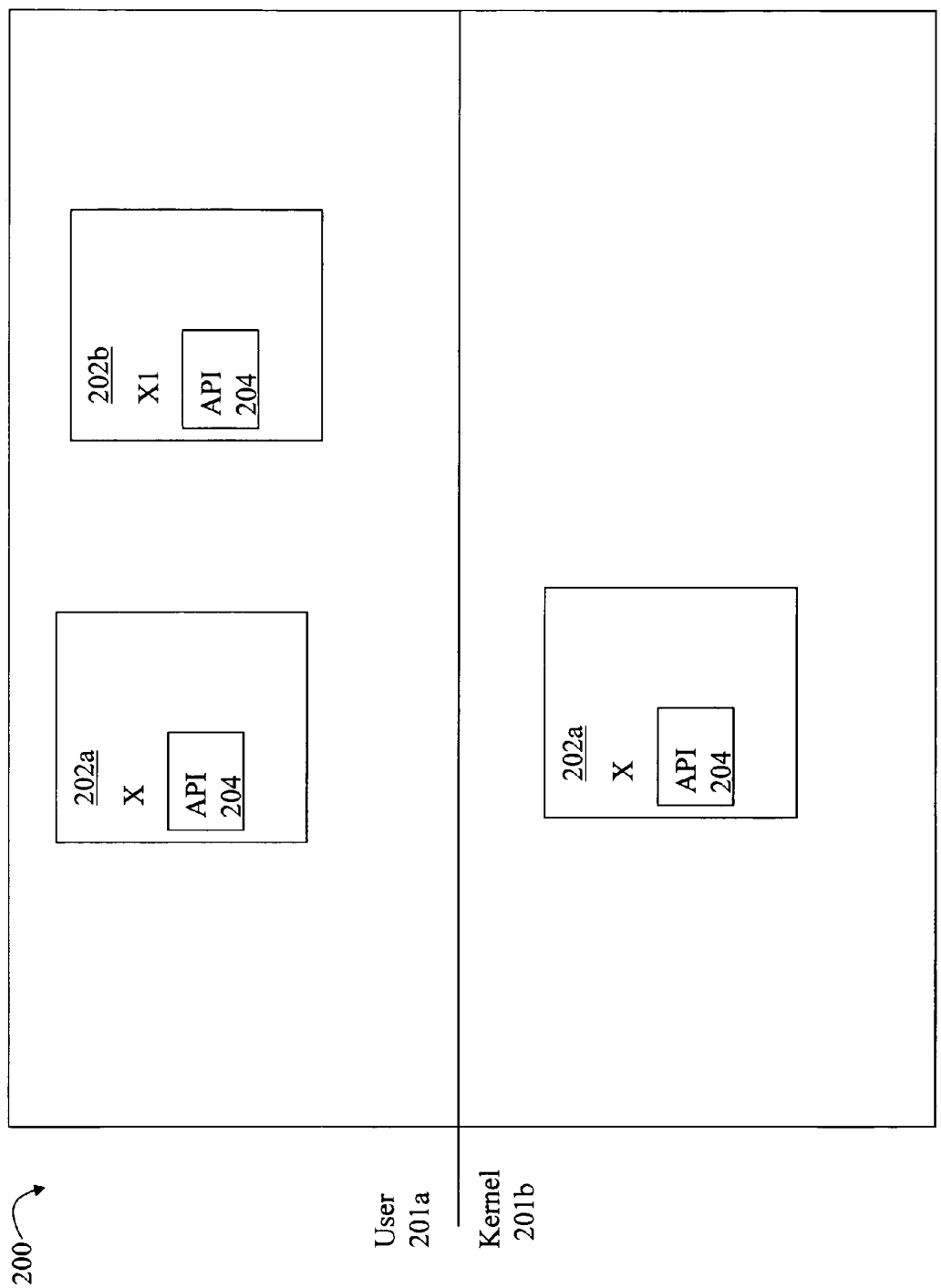

570

572 [bdefs]
572a    -HOST= host address/identifier or local
572b    - tool chain to use (e.g., GNU)

574 [mdefs] /* passed through in generated MK file and also include predefined names having meaning to build component*/
574a    -enable/disable compilation and/or linking options/flags
574b    -directory or location of where to find source, libraries to be linked against.
574c    -identify particular compiler (such as version) in tool chain to use 576 [mvars] /* predefined variables processed by, and having particular meaning to, build component */
576a    - allow user to specify overrides for directory or location of where to find source, libraries to be linked against, compiler location, object location, compilation flags, linker flags.

578 [cdefs] /* passed through in generated MK file and also include predefined/reserved names having meaning to build component*/
578a    -enable/disable conditional runtime code options (e.g., runtime debug assertions and/or checks; affecting amount and type of debug information output)
578b    -user may set predefined/reserved names to communicate information to the compiler

FIGURE 5A

TECHNIQUES FOR BUILDING CODE ENTITIES

BACKGROUND

Technical Field

This application generally relates to computer systems, and more particularly to techniques related to building code entities for use in a variety of different hardware and software environments.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A data storage system environment may consist of a wide variety of different hardware and software. For example, a data storage system may use a variety of different operating systems, hardware platforms, file systems, and the like. Problems may arise in connection with development of new code modules as well as for existing code modules intended for execution on data storage systems in order for the code modules to be usable in the different environments.

Thus, it may be desirable to utilize a flexible architecture and framework which allows a same code module to be used in the variety of different data storage systems and other environments.

SUMMARY OF THE INVENTION

In accordance with one aspect of the invention is a computer implemented method for building a code entity comprising: selecting a plurality of configuration files in accordance with a target and target variant, said target identifying hardware and software platform information about an environment in which the code entity is to be configured for execution, said target variant identifying a software build variation for a particular target; performing one or more build phases using the plurality of configuration files selected in said selecting; and generating the code entity as an output of the one or more build phases, the code entity varying with the target and target variant. The one or more build phases may include at least three build phases including a first phase which merges information from said plurality of configuration files. The plurality of configuration files may include a first configuration file specifying target specific build configuration options for the target and a second configuration file specifying target variant specific build configuration options for the target variant. The plurality of configuration files may include a third configuration file that is a default configuration file specifying default build configuration options for a plurality of different combinations of targets and target variants where each such combination is identified by a unique pairing of target and target variant. The target variant may be one of a plurality of target variants, said plurality of target variants including a debug variant where the code entity for the target is used for debugging on the target and includes one or more debugging options enabled, and a production variant where the code entity for the target is a non-debug variant executed on the target and includes the one or more debugging options disabled. The three build phases may include a second phase which performs dependency processing determination to determine what elements have been modified and what other elements dependent thereon require regeneration. The second phase may use a make system including a utility which processes statements specifying how to derive an element from each of its dependencies. The second phase may process statements specifying how to derive an object file from one or more source code files. The second phase may process statements specifying how to compile the one or more source code files to generate the object file and how to link one or more object files to generate an executable file. The first phase may generate a first build generated file including information used as input to the second build phase and the first phase may generate a second build generated file including information used as input to a third of the three build phases, said third build phase being invoked by the second phase. The third build phase may include compiling one or more source files into one or more corresponding object files and the second build generated file may include statements used by a compiler during said compiling. The first build generated file includes first information identifying one or more dependencies between at least two files and includes a definition identifying a compiler or a compilation option used in compiling in the third build phase. The default configuration file may include a first build configuration option and said target configuration file may include a second build configuration option overriding the first build configuration option. The first build generated file and the second build generated file may each include a portion of information as included in at least one of the first configuration file for the target or the second configuration file for the target variant. The first build generated file and the second build generated file each may include a portion of information that is derived information determined by the first phase. The target may vary with whether the code entity is configured for execution in user space or kernel space. A same set of user files may be used in generating code entities for a plurality of different targets, the same set of user files including one or more source files and one or more other files indicating dependencies, said one or more other files having predefined format. Each of the plurality of configuration files may include a plurality of sections of information. The plurality of sections may include a first section including build information used in a first of the three phases, a second section including information used in connection with processing performed in a second of the three phases, and a third section including information used in connection with processing performed in a third of the three phases.

In accordance with another aspect of the invention is a computer readable medium comprising executable code stored thereon for building a code entity, the computer readable medium comprising executable code for: selecting a plurality of configuration files in accordance with a target and target variant, said target identifying hardware and software platform information about an environment in which the code entity is to be configured for execution, said target variant identifying a software build variation for a particular target; performing one or more build phases using the plurality of configuration files selected in said selecting; and generating the code entity as an output of the one or more build phases, the code entity varying with the target and target variant. The one or more build phases may comprise at least three build phases including a first phase which merges information from said plurality of configuration files. The plurality of configuration files may include a first configuration file specifying target specific build configuration options for the target and a second configuration file specifying target variant specific build configuration options for the target variant.

In accordance with another aspect of the invention is a data storage system comprising a computer readable medium with executable code stored thereon for building a code entity, the computer readable medium comprising executable code for: selecting a plurality of configuration files in accordance with a target and target variant, said target identifying hardware and software platform information about an environment in which the code entity is to be configured for execution, said target variant identifying a software build variation for a particular target; performing one or more build phases using the plurality of configuration files selected in said selecting; and generating the code entity as an output of the one or more build phases, the code entity varying with the target and target variant.

BRIEF DESCRIPTION OF THE DRAWINGS

Features and advantages of the present invention will become more apparent from the following detailed description of exemplary embodiments thereof taken in conjunction with the accompanying drawings in which:

FIG. 2 is an example illustrating use of an API (application programming interface) in connection with a same code module that may be executed in user space and kernel space in an embodiment in accordance with the techniques herein;

FIG. 5A is an example illustrating information that may be included in a configuration file in accordance with techniques herein;

DETAILED DESCRIPTION OF EMBODIMENT(S)

Figure 1:
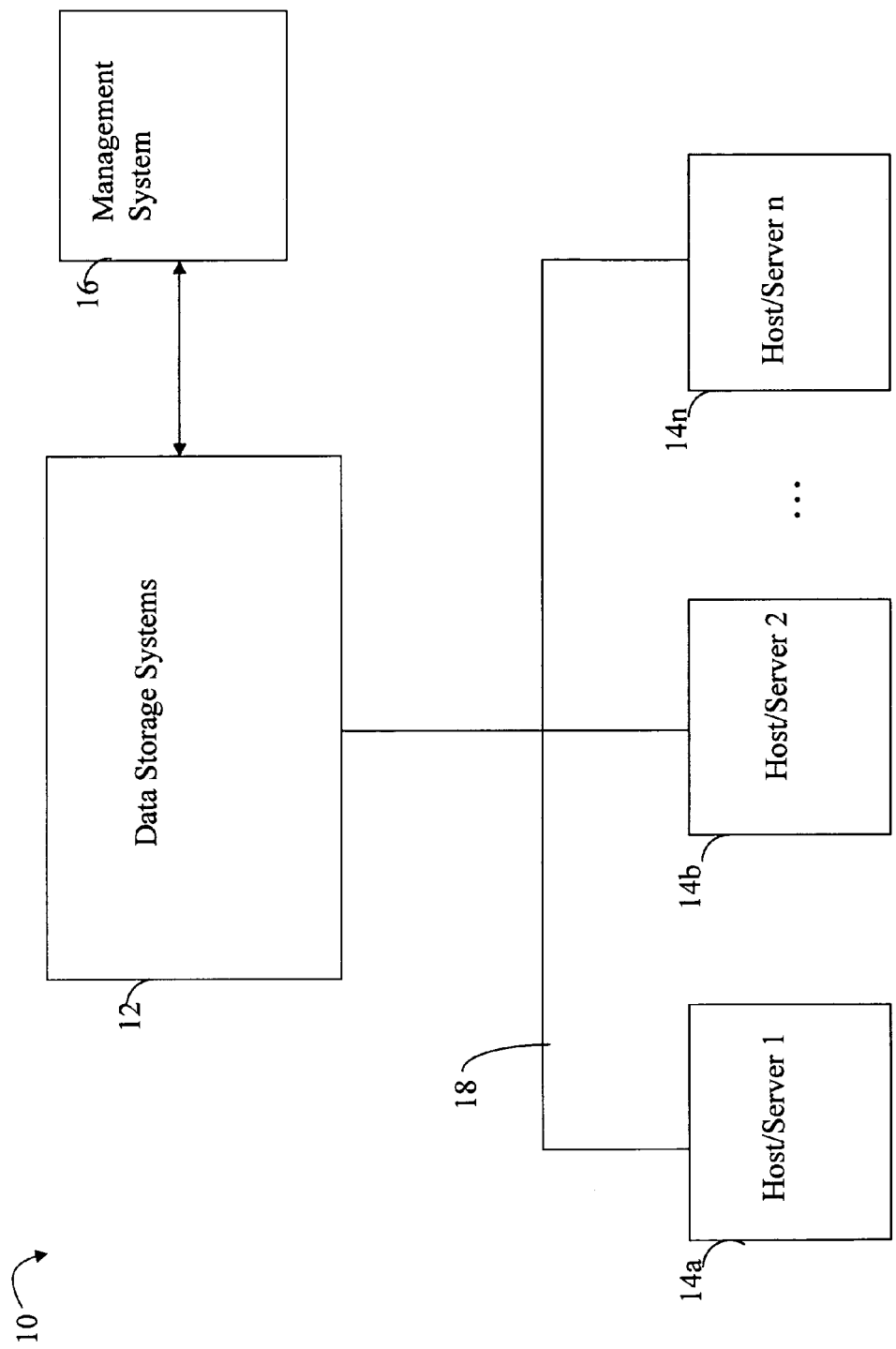
FIG. 1 is an example of an embodiment of a computer system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total life-cycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment (CSE) based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices, such as disks, flash memory drives, and the like. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14a-14n, provide data and access control information through channels to the storage systems, and the storage systems may also provide data to the host systems also through the channels. The host systems may not address the disk or other types of drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interface) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Referring to FIG. 2, shown is an example of components that may be executing on a processor node of a data storage system. If a data storage system has multiple processors, FIG. 2 illustrates components that may be executed by each such processor. In the example 200, shown are user mode or user space 201a and kernel mode or kernel space 201b with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, each of elements 202a and 202b included in user space 201a may be a code module executing in user space, such as a user space process or container. Each of 202a and 202b executing in user space may utilize an API 204 to perform different operations. Each of 202a and 202b in user space may be a user space process or container having its own process address space. Each user space process or container may have its own process address space. Thus, each user space process may be characterized as a single container or fault domain for fault containment purposes. In other words, each user process has its own state and can have an execution fault independent of, or isolated from, other containers or fault domains as may be associated with other user space processes as well as from code executing in the kernel space described below. Therefore, when one of the user space processes experiences a fault or otherwise terminates, the other code executing in other containers (such as other user space processes) may continue to execute without being affected by the fault. When a first of the executing processes, as may be executing in user space or kernel space is notified of the failing process (as may be executing in user space), the first process may also notify other executing user and/or kernel space modules. The first process, or other currently executing user space process or kernel space code, may perform processing on behalf of the failing process and may perform cleanup associated with the failing process. In one embodiment, each user process can save information about its own state in an area of memory external to the process so that another process can perform cleanup, resume processing of the failed process, and the like. Additionally, code executing in user space or kernel space process may take steps in response to the failing process in accordance with any outstanding requests or processing being performed by the failing process. For example, a first process may reissue its request previously made to a failing user process to another user process instance performing the same services or functionality as the failing process. In contrast to user space containers, all code executing in the kernel mode may execute in the context of the same address space so that if a fault occurs during execution of a kernel mode process or thread, the operating system may experience a failure. Thus, all the code executing in kernel mode 201b may be characterized as a single kernel fault domain or container in contrast to each separate fault domain, container and associated address space for each instance of 202a and 202b executing in user mode 201a.

As illustrated, the same code module represented by element 202a may also be executed in kernel space. As will be described in following paragraphs using the common software environment herein, a code module 202a may use API 204 which implements user and kernel mode variations of necessary operations allowing the same code module 202a to execute in both user and kernel mode without modification to the original source code. In other words, for a given API call, any coding difference in implementing the API call when executing in user or kernel mode, different operating system, or other data storage system environment particular, may be embedded in the code of the API.

In the example 200, the same code module 202a may execute in both user space and kernel space and use the same API 204. The underlying details implementing the functionality of the API call are embedded in the API code and not the code associated with 202a. Using the API 204, an embodiment may make a same set of functionality available to code that executes in both user and kernel space and leave the implementation details of the API calls to be included in the API code. The API may provide services to kernel space code which are implemented using, and may be otherwise only available to, code executing in user space. Similarly, the API may provide services to user space code which are implemented using, and may be otherwise only available to, code executing in kernel space. For example, a device driver or other code module typically executed in kernel mode may alternatively be executed in user mode with the ability to have multiple instances and allow a first instance of a driver to assist in recovery on failure of another device driver instance. As another example, during development of code that will execute in kernel mode, the code modules may be developed and executed in the user mode to facilitate debugging. At a later point once debugging is complete, the code may be executed in kernel mode unmodified.

As described above, the common software environment may include the API and other code modules to implement the framework providing the user-kernel portability as well as portability among different hardware and software platforms (e.g., different operating systems, data storage systems and underlying hardware, and the like). The common software environment may include other code provided as a layer between the API and operating system specific code, for example, to facilitate communications with devices.

As described above, the same API may be used by a code module when the code module is executed in user space, kernel space, and/or on different data storage systems having different environments such as different operating system and/or processor architecture. The code module may make API calls so that the API implements the same set of API calls to facilitate portability of the code module for execution in user space or kernel space or on any one of a variety of different software environments that may be supported in accordance with the functionality included in the API. Thus, a module coded using the API as described herein may be executed in user mode or kernel mode unmodified. Furthermore, the same module may be executed on different data storage systems having different data storage system environments provided the particular data storage system environment is supported by the API. Thus, processing dependencies that may vary with user or kernel mode as well as operating system and underlying processor architecture may be handled by the API code so that a module utilizing the API as described herein may be executed in a variety of different data storage system environments as well as user or kernel mode.

It should be noted that although the example 200 of FIG. 2 illustrates a single code module 202a included in a first U-space (user space) container, a single code module 202b included in a second U-space container and a single code module 202a included in a K-space (kernel space) container, each of the foregoing containers may include multiple code modules and multiple threads or other code execution entities.

Figure 2A:
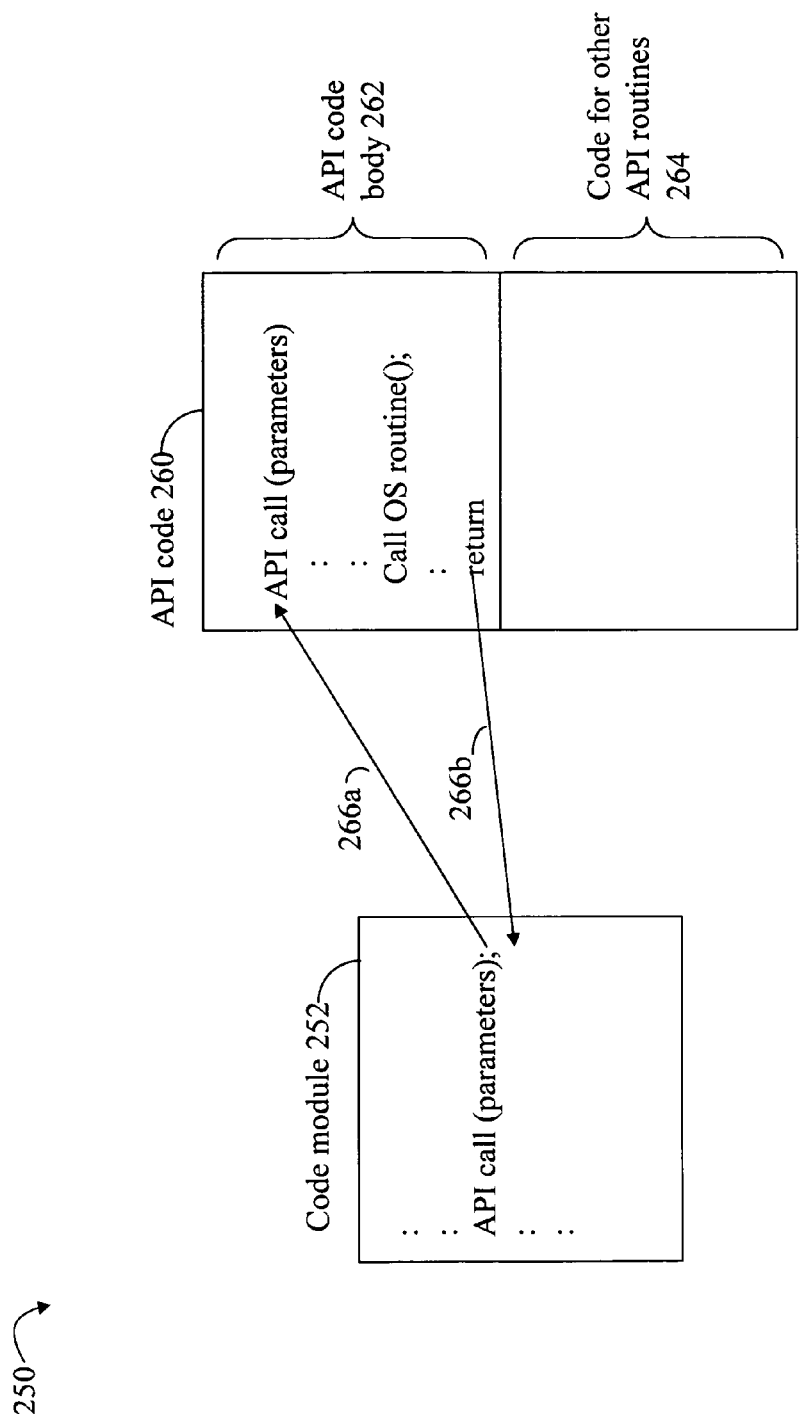
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API of an embodiment in accordance with the techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation, such as a scheduling and synchronization primitive, in connection with the API is not directly available in a native operating system, the functionality may be simulated using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call, such as to dynamically and physically load or unload a module from a container, for use in synchronization such as with locking and unlocking operations with respect to a mutex object (e.g., object use for enforcing mutual exclusion), and the like. Subsequently, control is returned to the code module 252 as indicated by 266b when the API code body 262 has completed. It should be noted that in the example 250, the code module 252 calls a routine in the API. The code module 252 may be code developed to run in user mode, kernel mode, and/or in any one of a variety of different environments each having a different operating system.

As described in more detail elsewhere herein in one embodiment, the code module 252 may be executing in user space or kernel space and may be executing, respectively, in the context of a U-space or K-space container having its own address space. Described in following paragraphs are techniques that may be used in connection with a build system that provides for building code entities, such as a code module, library, and the like, that may have any one or more different output forms and formats in accordance with the target upon which the code entity will be executed or otherwise utilized. The target may be defined as the a combination of hardware and/or software platform upon which the code entity will be executed or other utilized. The hardware platform may vary with the underlying processor architecture (e.g, machine instructions for an Intel-based processor or other vendor, big endian or little endian format, uniprocessor or multiprocessor hardware, and the like). The software platform may vary with, for example, operating system (e.g., Linux, Windows-based operating system), variation of a particular operating system (e.g., different versions of Linux, different versions of Microsoft Windows (Windows XP™, Windows Vista™), whether the resulting code entity is to be executed in U space or K space, and the like. Additionally, a generated code entity may have different variants or variations for a particular target referred to herein as a target variant. Examples of target variants may include a debug build that enables particular debugging features, a retail or production build which may not include the foregoing debug features when producing a commercial version of a build for software release, and the like. Thus, with target variants, the underlying hardware and/or software platform upon which the code entity is used does not vary but rather options of the build techniques described herein allow for variations of the code entity for a particular target. The build system described in following paragraphs provides a building environment which allows a user to provide a set of inputs for which one or more different code entities may be generated for one or more corresponding target and target variant. Additionally, as will be described herein, an embodiment may provide support for multiple tool sets, suites or tool chains. For example, Visual Studio™ by Microsoft or GNU are examples of such tool sets.

It will be appreciated by those skilled in the art that a routine in the API 260 may also be invoked by other bodies of code including, for example, another API routine, operating system code, and the like. In any case, the API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

Code modules included in a system may be developed by multiple developers in different environments. The code modules themselves may be meant for use in different environments. In accordance with one aspect and use of the techniques herein in an embodiment, the code module may be characterized as utilizing a universal loadable module interface that may be developed for use in different environments. For a same user provided code module, different code entities having different forms and formats may be generating using the build techniques described herein. For example, code modules, such as described in U.S. patent application Ser. No. 12/456,835, filed Jun. 23, 2009, UNIVERSAL MODULE MODEL, which is incorporated by reference herein, is example of one type of logical code module that may be built using the techniques herein to generate corresponding output, a code entity, having a form and/or format that may vary with target and target variant.

In accordance with techniques herein, an embodiment of the build system may automatically generate and maintain a per-object or per element dependency information. For common types of build elements or objects (e.g., modules or libraries such as a module built in accordance with a predefined logical construct as described in the U.S. patent application Ser. No. 12/456,835 mentioned above), a user may specify a minimal amount of information, such as what elements are to be included in the build, and the build system may perform processing necessary to generate the desired resulting output such as a code entity for a particular target and target variant.

It should be noted that the target as described in connection with the techniques herein may refer to the execution environment of where the output generated by the build processing with be executed or other utilized. Note that the foregoing may be distinct from the environment of the system and platform on which build processing described herein is performed in order to generate the output (e.g., resulting code entity).

Figure 3:
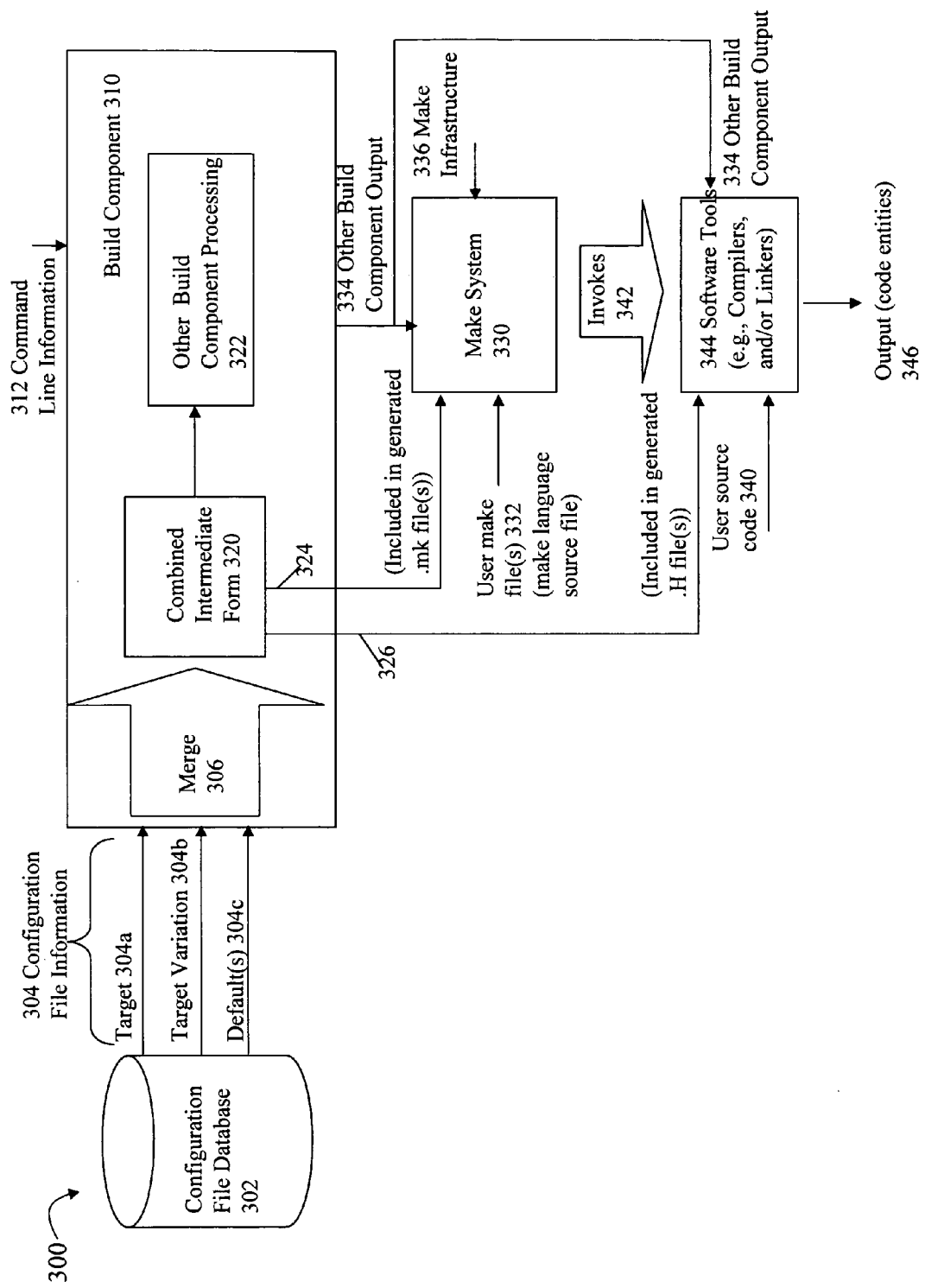
FIG. 3 is an example of processing and components that may be included in an embodiment of a build system in accordance with techniques herein.

Referring to FIG. 3, shown is an example of components of a build system in accordance with techniques herein. The example 300 includes a configuration files database 302, a build component 310, make system 330 and software tools 344 such as compilers, linkers, and the like. The example 300 may be characterized as generally illustrating a three phase or stage build system including processing by the build component 310, make system 330 and other software tools 344. As described in more detail below, a user may provide one or more configuration files, one or more make files and one more source code files for use with the techniques herein generating an output 346, such as a code entity for a particular target and target variant.

The configuration database 302 may include a plurality of configuration files. Each configuration file may be provided by a user of the build system herein to specify build system configuration options for different target and target variation combinations. In accordance with the techniques herein, an embodiment may generate a single output 346 or code entity for each particular combination or pairing of target and target variant. The configuration files provide the user with a mechanism to specify information in connection with the build component, the make system and other software tools, such as a compiler, linker, and the like, which may be invoked by the make system in connection with generating output of the build system.

The database 302 may be more generally referred to as a data store of any one of a variety of different types and formats in which configuration files may be stored. For example, in one embodiment, the configuration files of 302 may be implemented using a directory or subdirectory structure of files. The database 302 may include one or more default configuration files and a configuration file for each configured target. For each possible target, the database 302 may also include one or more target variation configuration files. As an example, if there are 4 targets and each target can have 2 variants, the database 302 may include 8 configuration files, one for each possible target and, for each target, each possible target variant. It should be noted that an embodiment may use a same target variant with more than one target. For example, an embodiment may have 4 targets and 2 variants for each target. In this case, there may be a total of 6 configuration files where there is different configuration file for each target (4 in total) and two variant configuration files where each variant configuration file may be configured for use with each of the 4 targets.

The database 302 may also include a default configuration file for use with one or more different combinations of target and target variant. There may be, for example, a universal default configuration file specifying defaults for the build system for any possible target and variant combination. An embodiment may also include a default configuration file for use with other subsets of defined target and variant combinations such as for all combinations for a particular operating system or other common hardware and/or software aspect of a target. As will be described in more detail below, an embodiment may specify a particular language, format, features, and the like, for use with configuration files. A user who desires to use the build system may populate the database 302 with one or more configuration files to support the desired target and target variants for building. The database 302 may be populated with the foregoing configuration files prior to use for building and generating an output 346.

In an embodiment in accordance with techniques herein, a user may also provide one or more make files 332 (as input to the make system 330) and user source code 340 (as input to the software tools 344, such as input for compilation, linking, and the like) in order to generate the output 346.

As part of performing build processing, a user may specify via command line information 312 one or more target and target variant combinations as input to the build component 310. The build component 310 may then extract the appropriate one or more configuration files in accordance with configuration files specified for a defined target 304a, target variation 304b and any defaults 304c. In one embodiment, a first directory may include the target specific configuration files, a second directory may include the target variant specific files, and a third directory may include the default files. When a target and target variant are specified such as via command line information 312 when invoking the build system, the build component 310 may select a first configuration file for the specified target from the first directory and select a second configuration file for the specified target variant from the second directory. Additionally, one or more default configuration files may be selected from the third directory. The build component 310 then merges 306 the selected configuration files into a combined intermediate form 320. The form 320 may be an internal form as used by the build component 310 in connection with performing other processing.

As illustrated by element 324, information from the combined intermediate form 320 may be used in connection with processing performed by the make system 330. As illustrated by element 326, information from the combined intermediate form 320 may be used in connection with processing performed by the other software tools 344, such as a compiler. Information as represented by 324 and 326 may be specified within the configuration files and passed to the appropriate subsequent processing phase. The build component 310 may also determine other information as represented by 334 such as derived information or information not specifically included in one of the configuration files. Portions of the derived information 334 may be input to subsequent processing, such as performed by the make system 330 and/or other software tools 344. In one embodiment described herein, information represented by 324 and 334 which is communicated to the make system 330 may be included in a make file which is produced by the build component 310. An example of the information represented by 324 and 334 communicated to the make system 330 may include identifying the particular tool chain or tool set to use, compiler in the tool chain, compilation flags or options, linker flags or options, location of source files, location of object files, and the like. In this embodiment, information represented by 326 and 334 which is communicated to the other software tools 344 (such as a compiler) invoked by the make system 330 may be included in another output file produced by the build component 310. As will be described in more detail below, the foregoing information represented by 326 and 334 communicated to 344 may be in the form of a file which is input to a compiler invoked by the make system 330. For example, the file may be a .H (header) file (e.g., including C language preprocessor definitions, macros, and the like, such as, for example, C language #define statements defining constants) used in connection with a C language compiler invoked by the make system 330 to generate an object file included in a library. An example of the information represented by 326 and 334 communicated to the other software tools 344 may include source language defined constants used by the source code to conditionally include and/or exclude portions of code for compilation (e.g., portions of code may be conditionally compiled such as through the use and evaluation of C language preprocessor #define constants).

The build component may be implemented using any one or more different techniques known in the art. For example, one embodiment of the techniques herein may implement the build component using Perl language scripts.

The second phase of processing may be performed by the make system 330 which is invoked by the build component 310. As known in the art, the make system 330 may be characterized as a utility or tool used in software development for automatically building executable programs, libraries, and the like, from one or more inputs, such as from source code. Files referred to as make files specify how to derive a resulting output from each of its dependencies. There are different versions of make that may be used in connection with the techniques herein such as one or more such utilities available for use with Unix-based platforms. It should be noted that although the term and description of a make system is provided herein for purposes of illustration, the functionality of a make system may be more generally characterized as a dependency tracking build utility or tool. The techniques herein are not limited for use with the particular utility illustrated for purposes of example.

When using the make system, dependencies between files are described. In connection with techniques herein, the user may provide a user make file 332 which includes a portion of the dependencies and other details as may be needed and/or optionally specified for use with the make system for the particular target and variant. In other words, the user make file may be characterized as a universal or generic make file for use with one or more different combinations of target-target variants. For example, the user make file may include portions for one or more different combinations of target-target variants and may also include the necessary logic to conditionally include the correct portion(s) for each particular target-target variation. The build component 310 and make infrastructure code 336 may handle providing any remaining information needed by the make system 330 in a form for consumption and use by the make system 330. Make infrastructure 336 may include other logic encoded in make files supplied with the build system for use with user make files 332. The user make files 332 may have a defined structure in accordance with a template and may reference appropriate portions of the make infrastructure 336. As known in the art, a make file may include macros, statements such as those which may be characterized as rules in the form of declarative statements (e.g., stating build dependencies and orderings), and the like as may be supported by a particular make system or other system, utility, application, and the like, as may be used in an embodiment in accordance with the techniques described herein. This is described in more detail in following paragraphs.

It will be appreciated by those skilled in the art that an embodiment may implement phase two processing described herein using a commercially or publically available version of the make utility along with additional make files (e.g., make infrastructure) including instructions interpreted by the make utility to perform additional processing and provide additional functionality as described herein.

The third phase of build system processing may be performed by one or more other software tools 344 invoked using the make system 330. As an example, the make system 330 may process make files including statements in a form processed by the make system 330 (e.g., in accordance with a defined language, format, and the like, as understood by the make system 330 when the make files are parsed by the make system 330). The statements in the make files specify dependencies, for example, between different source files causing rebuilding of necessary files, such as object files, due to any source file changes. For example, if x.obj (object file) depends on two source files, x.src and y.src, the language of the make file specifies this dependency so that if either x.src or y.src is modified since the previous generation of x.obj, then x.obj is rebuilt such as by recompilation of the modified source(s) upon which x.obj depends. In turn, anything that depends on x.obj is also then rebuilt. The foregoing chain of dependencies may be expressed through inputs to the make system 330 so that the system 330 may invoke the appropriate tools, such as compilers, linkers, and the like. The software tools 344 may process one or more inputs, such as user source code 340, where the particular inputs vary with the one or more tools 344 invoked by the make system 330 in connection with producing the output 346, such as a code entity.

The output 346 generated by the build system for a particular target and target variant may vary. In one embodiment, user source code 340 may have a template or form in accordance with one or more defined types of logical constructs. As such, the code entity generated may have a particular form that varies with the target and target variant for the encoded logical construct. As an example, user source code 340 may be encoded in accordance with the template described in the U.S. patent application Ser. No. 12/456,835 mentioned above for a module. For such a module which is to be executed on a target using a Linux-based operating system in U space, a shared object (e.g. .SO file extension) may be generated. For such a module which is to be executed on a target using a Linux-based operating system in K space, a kernel object (e.g. .KO file extension) may be generated. For such a module which is to be executed on a target using a Windows-based operating system in U space, a dynamic link library (e.g. .DLL file extension) may be generated. For such a module which is to be executed on a target using a Windows-based operating system in K space, a system file (e.g. .SYS file extension) may be generated.

In one embodiment, the command line information 312 specified when invoking the build system 300 may include one or more targets in a target list and one or more target variants in a variant list. The build component 310 may determine all target-target variant combinations based on the foregoing and generate an appropriate output 346 for each such combination. The particular target-target variant combination may be one type of derived information communicated to the compiler or other software tool 344. If multiple target and target variant combinations are specified on a command line thus requiring the build system to perform multiple builds generating multiple corresponding outputs, the build system may perform the foregoing multiple builds serially or in parallel.

Figure 4:
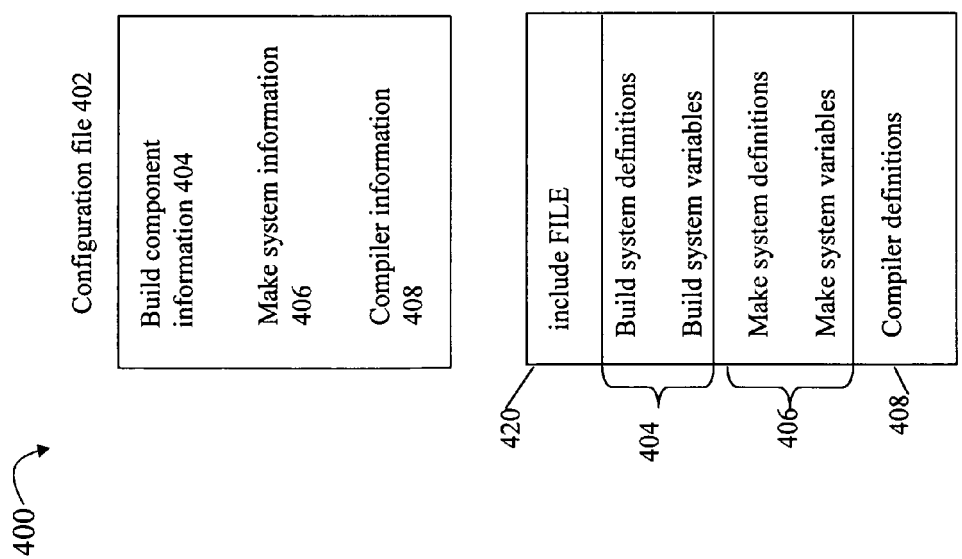
FIG. 4 is an example illustrating a format of a configuration file as may be used in an embodiment of a build system in accordance with techniques herein.

Referring to FIG. 4, shown is an example representation of information that may be included in a configuration file in an embodiment in accordance with techniques herein. The example 400 includes a configuration file 402 comprising build component information 404, make system information 406 and compiler information 408. Information from 404 is communicated to and/or used by the build component 310. Information from 406 is communicated to and/or used by the make system 330. Information from 408 is communicated to and/or used by a compiler as represented by element 344 of FIG. 3. It should be noted that an embodiment may include other sections than as illustrated in the example 400.

Element 420 represents in additional detail information that may be included in each of 404, 406 and 408. Additionally, the configuration file language may provide syntax to incorporate other files, such as using the include FILE directive, which may include other configuration information.

Figure 5:
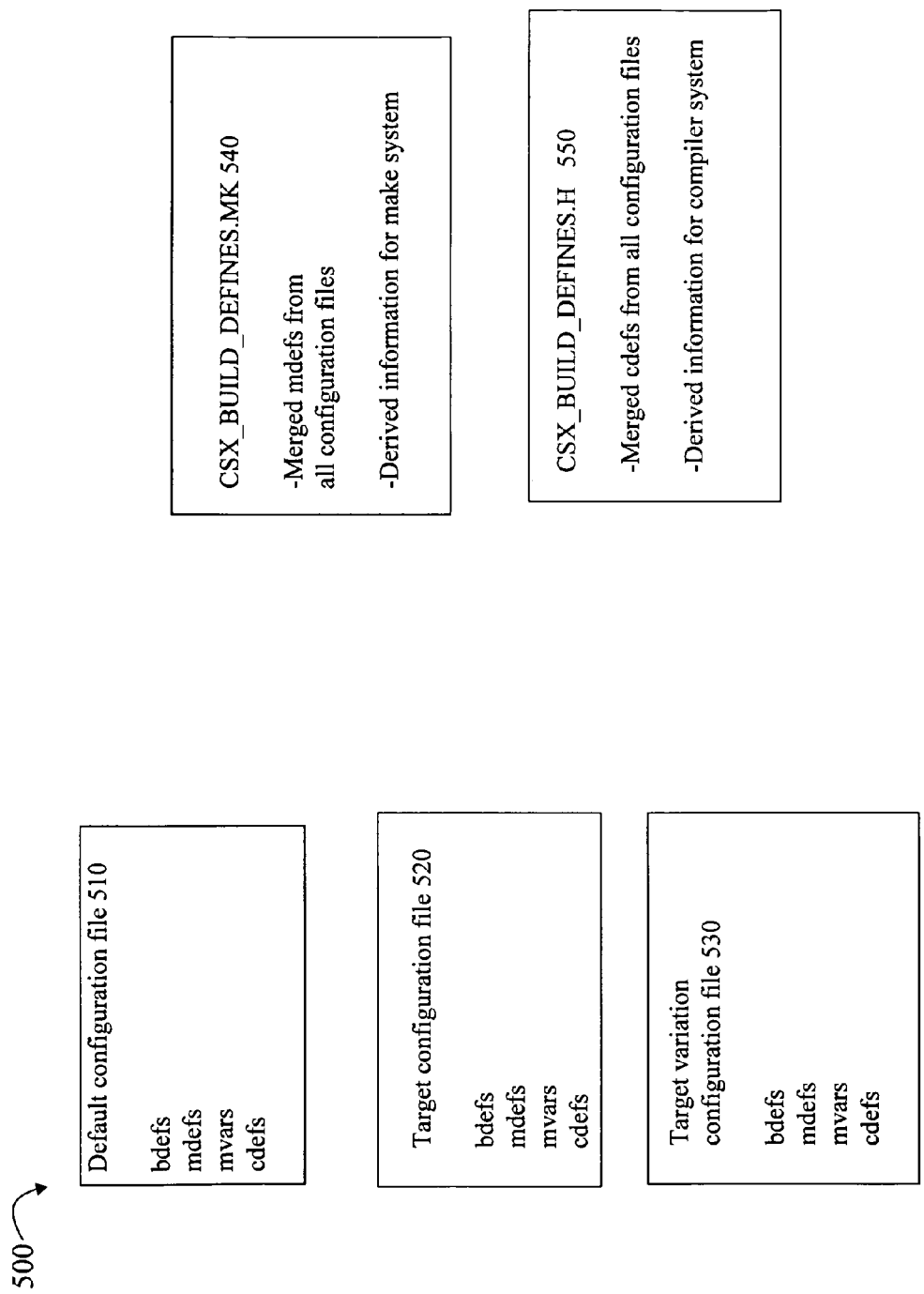
FIG. 5 is an example illustrating configuration files in more detail and illustrating the files as may be generated by the build component in an embodiment of the build system in accordance with techniques herein.

Referring to FIG. 5, shown is additional detail regarding configuration files as may be included in an embodiment in accordance with techniques herein. The example 500 provides further detail in addition to that as described in FIG. 4. In the configuration files of 500, different portions of the file which correspond to each of the build information, make system information and compiler information may be delimited using keywords or tags. However, an embodiment may use other syntax and file formats. The example 500 includes a default configuration file 510, target configuration file 520 and target variation configuration file 530. Each of the foregoing configuration files may include a bdefs section including definitions used by the build component, an mdefs section including definitions used by the make system, an mvars section including variables used by the make system, and a cdefs section including definitions used by a compiler. A configuration file may optionally omit one or more of the foregoing. For a particular target-target variation combination, the build component may select the appropriate instance of 520, 530 and optionally 510, and merge information included in each of the foregoing bdefs, mdefs, mvars and cdefs sections therefrom.

The build component 310 of FIG. 3 may generate a make file, denoted as CSX_BUILD_DEFINES.MK 540, including statements consumable or used by the make system 300. The element 540 may generally represent a make file or other file generated by the build component for use by the make system or other system handling dependency determination triggering rebuilds as needed based on changed elements and dependencies on those changed elements. Element 540 may include information from the merged mdefs and mvars sections from all the configuration files for the target-target variant combination. Element 540 may also include derived information as determined by the build component for use by the make system.

The build component 310 of FIG. 3 may generate a file for use by a compiler such as a C language .H (header file), denoted as CSX_BUILD_DEFINES.H 550, including statements consumable by a C language compiler. The element 550 may generally represent a C language file or other file generated by the build component for use by one of the other software tools of (such as a compiler) of the third phase where such tools may be invoked by the second phase processing (e.g., make system or other system handling dependency determination triggering rebuilds as needed based on changed elements and dependencies on those changed elements). Element 550 may include information from the merged cdefs section from all the configuration files for the target-target variant combination. Element 550 may also include derived information as determined by the build component for use by the compiler or other tool in the third phase of processing when invoked by the make system or other second phase processing in accordance with changes to source code, objects and other elements, and dependencies thereon.

Referring to FIG. 5A, shown is an example of information that may be included in a target configuration file. Element 572 may denote the bdefs section communicating build information for consumption by the build component in the first phase of processing. The bdefs section 572 may indicate in 572*a* whether the build is to be performed on a local system or host (e.g., from where the build system is invoked) or otherwise may identify a remote other host upon which build processing is to be performed. In 572*b*, the bdefs section may identify a tool chain to be used in connection with performing the build. In connection with 572*a* and 572*b*, the bdefs section may include predefined or reserved names to which a semantic meaning is interpreted by the build component. When one of the reserved or predefined names is assigned a particular value in the configuration file, the build component interprets the value as being set and communicated in connection with the particular semantic meaning.

Element 574 may denote the mdefs section communicating information for consumption by the make system or second phase of processing. The mdefs section 574 may include predefined or reserved names to which a semantic meaning is interpreted by the build component. When one of the reserved or predefined names is assigned a particular value in the configuration file, the build component interprets the value as being set and communicated in connection with the particular semantic meaning. The mdefs section 574 may also include other name=value settings where the name does not have a reserved or particular semantic meaning to the build component. In this latter case, such information may be passed through by the build component to the make system (e.g., such as by including such information "as is" in the generated CSX_BUILD_DEFINES.MK file). In this example of 574, the build component may have predefined or reserved names in connection with compilation and/or linking options (574*a*), directory or location of where to find source files, libraries to be linked against (574*b*), identifying a particular compiler in a toolchain, compiler version, or location thereof (574*c*), and the like.

Element 576 may denote the mvars section communicating information for consumption by the make system or second phase of processing. The mvars section 576 may include predefined or reserved names to which a semantic meaning is interpreted by the build component. When one of the reserved or predefined names is assigned a particular value in the configuration file, the build component interprets the value as being set and communicated in connection with the particular semantic meaning. The settings in the mvars section may have a special syntax in connection with these reserved or predefined names where a user can:

set a value such as with NAME=VALUE add text (or concatenate text) to the end of an already set name with NAME+=TEXT and remove text from anywhere within a previously set/assigned NAME with NAME-=TEXT.

In connection with the foregoing, a default configuration file may specify default settings using mvars, mdefs, and the like. A target configuration file may override such default settings using the techniques herein if the build component in the embodiment processes the default settings first in time and then subsequently processes the target (and target variant) configuration files. An embodiment in accordance with techniques herein may allow a user to control and specify the order in which configuration files are processed and thus, may affect the order in which settings for defaults, targets and/or target variants are processed and thus determine the final setting or value of a variable, constant, and the like. For example, an embodiment may automatically (through the use of the build component) retrieve and process configuration files for a target-target variant specified via input (e.g., the command line information) to the build component of the build system of FIG. 3. A user may include a default configuration file, such as via a .include directive in one of the target and/or target variant configuration files. The final value or setting may be dependent on the order in which statements are processed which reference a variable, constant, and the like, (e.g., last reference or setting of a variable or constant is the final value or setting). In another embodiment, the build component may automatically retrieve the foregoing target and target-variant configuration files and also automatically retrieve any default configuration file (e.g., such as look for a default file for processing in a known or predetermined location). The build component may then process information from each of these configuration files (e.g., target, target-variant and default) and give precedence to any setting in a target and/or target-variant configuration file over any other setting for a same variable, constant, and the like, as specified in a default configuration file so that any values in the default configuration file are overridden by the target and/or target variant configuration files. The build component may further resolve any duplicative settings or assignments in the target and/or target-variant configuration files assigning a value to a same variable, constant, and the like, based on an order in which such statements are processed (e.g., last such assignment may be the final value or setting). In this latter example, the build component may have encoded in logic therein the foregoing precedence ordering rather than relying on a user-specified order in which various configuration files are processed.

It should be noted that, in contrast to items included in the mdefs section, items included in the mvars section which do not have predefined or reserved meaning to the build component may not be passed through "as is" for inclusion in the build generated make file, CSX_BUILD_DEFINES.MK file. If the item (e.g. name) being assigned a value is not recognized by the build component, an error may be generated. An embodiment may only allow use of predefined or reserved names in the mvars section so that all the information in mvars may be processed by the build component and may result in output of the specified variable and value or derived information by the build component. For example, a predefined or reserved variable name may be associated with compilation options by the build component. Those compilation options may be included in one or more compilation command lines executed by a compiler when such a compiler is invoked by the make system. The compilation options may be derived in that a variable may be defined which represents compilation options collected across multiple configuration files during configuration file merge processing, or, the variable and associated value included in the build generated make file may correspond to that as included in a single configuration file.

Consider another example of derived information regarding file dependencies in connection with configuration files. The user's make file may not define any dependencies with respect to any configuration files. However, if a configuration (such as a target configuration file) is modified, an embodiment may assume that a complete rebuild is necessary of all files for any target-target variant associated with the modified target configuration file. The foregoing implicit dependency between configuration files and other files generated during the build system processing may be expressed by the build system outputting a dependency list identifying such implicit dependencies. Using macros and the like as may be included in other make file infrastructure code, additional make files and code may be generated identifying such implicit dependencies for each user source file.

Element 578 may denote the cdefs section communicating information for consumption by a compiler or other tool in the third phase of processing. The cdefs section 578 may include predefined or reserved names to which a semantic meaning is interpreted by the build component. When one of the reserved or predefined names is assigned a particular value in the configuration file, the build component interprets the value as being set and communicated in connection with the particular semantic meaning. As with the mdefs section, the cdefs section 578 may also include other name/value associations (e.g., such as for constants, variables and the like, as described elsewhere herein) where the name does not have a reserved or particular semantic meaning to the build component (e.g., 578*b*). In this latter case, such information may be passed through by the build component to the compiler (e.g., such as by including such information "as is" in the generated CSX_BUILD_DEFINES.H file). In this example of 578, the build component may have predefined or reserved names in connection with enabling/disabling conditional compilation options (578*a*) (e.g., runtime debug assertions and/or checks affecting an amount and type of debug information output). In connection with 568*b*, the cdefs section may be used to communicate information "as is" to the compilation process (e.g., include C language #define statements for constants defined and used during compilation).

As another example, an embodiment may include two target variants for a target where the target variants are debug and retail or production. Debug indicates generating a debug variant of the generated code entity such as may be used in connection with software development to debug a version of a product or software application under development. In contrast, a retail or production variant may be associated with a commercial variant such as may be sold and/or shipped for customer commercial use. A debug target variant configuration file may include appropriate settings in the mdefs and/or mvars section to enable generation of debug information during compilation and linking. The retail or production variant may ensure that the foregoing settings are disabled. For example, the foregoing may be performed by selectively enabling/disabling an option. The option setting is then subsequently referenced in conditionally evaluated make statements which may selectively build or not build other objects, selectively include or exclude certain files, and the like. Furthermore, a cdefs section in the debug variant configuration file may selectively enable or disable different constants used in connection with selecting compile time options that enable/disable compilation of code portions for the different compile time options such as for runtime debug assertion or other runtime checks (e.g., the C language preprocessor #define statements may provide for conditionally compiling different code portions based on whether certain options are enabled/disabled).

With reference back to FIG. 5, it was noted that the build generated make file 540 may include derived information which is derived by the build component and included in the file 540. It should be noted that the derived information is information determined by the build component and is in contrast to the merged mdef information which may be included "as is" from the merged one or more configuration files. Such derived information may include, for example, information determined through merging of the mvars sections for one or more configuration files. As an example, a predefined name in the mvars section may be defined an initial value in the default configuration file and then overriden by an mvars section in the target or target variant configuration file. The final value may be characterized as derived information communicated in the file 540 as appropriate for the named variable or item. For example, if the item redefines a directory location for a compiler, such a redefinition or override will affect every reference to the compiler in a command line. Other derived information that may be output in the build generated make file 540 may include information that identifies the target and target variant being built, identifies whether the build is for kernel and/or user space, identifies the version of the build system and/or components thereof, current settings for tool chain to be used, other current settings for the environment, information regarding current settings for the directory structure (e.g., directory location of source, object, default directory location of where build processing is being performed), and the like. Such derived information may be directly used by the make system and/or communicated to one of the other tools, such as a compiler, via a command line option or other parameter setting.

With reference back to FIG. 5, it was noted that the build generated .H file 550 used in connection with the third phase may include derived information which is derived by the build component. It should be noted that the derived information may include information determined by the build component and is in contrast to the merged cdef information included "as is" from the merged one or more configuration files. Such derived information may include, for example, cdef settings having a value determined by the build component through one or more inputs to the first phase of processing and from which the build component extracts information. Such derived information may include, for example, settings indicating the compiler type. For example, the build component may include:

define COMPILER_TYPE_GNU in the file 550 if the build component determines through one or more inputs processed that the GNU C language compiler will be used.

Such derived information may include, for example, settings indicating whether big or little endian formatting is used. As known to those of ordinary skill in the art, big endian and little endian describe an ordering or sequence in which multi-byte data is stored in memory. Byte order storage may impact the compatibility between devices within and outside of a system. The order in which the data is stored into memory may vary in accordance with the particular hardware. Big endian and little endian each refer to a particular ordering in which bytes are stored in memory. Little endian formatting specifies that the least significant byte is stored in the lowest memory address. Examples of little endian processor architecture include, for example, IA32 and IA64 architecture, and the like, used by Intel, AMD and other CPU vendors. In contrast, big endian formatting takes the most significant byte and stores it in the lowest memory address. Examples of a big endian processor architecture include, for example, the PowerPC and MIPS architecture, used by, IBM, Motorola, PMC, and other CPU vendors. In accordance with the foregoing, for example, the build component may include:

define ENDIAN_TYPE_BIG in the file 550 if big endian formatting is used and may include:

define ENDIAN_TYPE_LITTLE in the file 550 if the build component determines through one or more inputs processed that the little endian formatting is used.

The build component may include similar definitions and/or settings in the file 550 indicating word size (e.g., number of bits/word as 16, 32, 64, and the like), processor type (e.g., identifies which Intel processor, which IBM processor, etc.), indicating other information regarding the target hardware and/or software (e.g., operating system as Linux-based, Windows-based, etc.).

Figure 6:
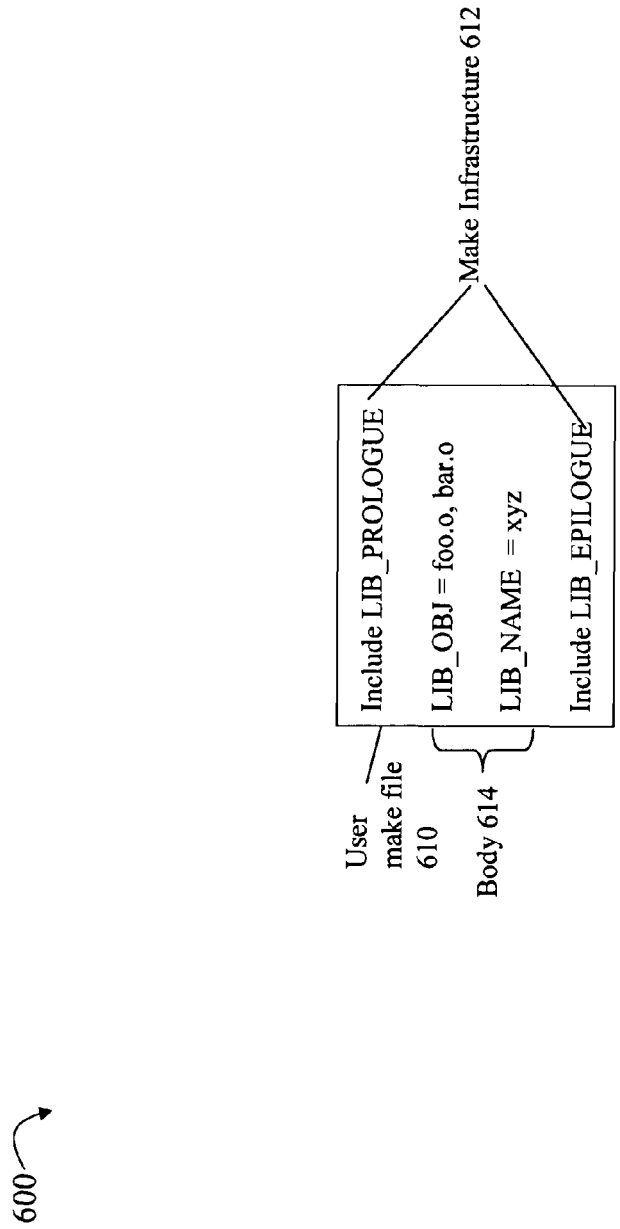
FIG. 6 is an example of a user make file in accordance with techniques herein.

Referring to FIG. 6, shown is an example representation of a format or template of a user make file in an embodiment in accordance with techniques described herein. The example 600 illustrates a user make file 610 referencing make infrastructure files 612 and including a body 614 of user provided make instructions. The body 614 identifies the name of the library as XYZ and that the library should include, and depends upon, two objects, foo.o and bar.o, both of which are assumed to be produced from corresponding user-supplied source files (e.g., such as foo.c and bar.c for C language source files). A particular language for the associated source files may be assumed by default by the build system, or may be derived by the build system such as, for example, via filename extension (e.g., ".c" file extension implies the file is a C language source file; ".o" filename extension implies the file is an object file). It should be noted that the statements included in this, and other make files, in examples herein may not be in accordance with any particular syntax but rather may illustrate the logic encoded therein.

The make infrastructure 612 may include one or more other make files provided in the build system for a particular use case or application in accordance with a use of the generated build output (e.g., 346 of FIG. 3). As illustrated with 612, the format of the user provided make file 610 may reference appropriate prologue and/or epilogue make files (e.g., respectively LIB_PROLOGUE and LIB_EPILOGUE) for this particular use case of building a library. Generally, the prologue make file, LIB_PROLOGUE in this example, contains any definitions the statements within the body 614 may want to know or otherwise reference. For example, if variables or constants are referenced in the body 614, such variables or constants as may be supported by the make file language may be defined in the prologue or other file included by the prologue. As a further example, the prologue make file may define a variable, such as CSX_INFRA, identifying a directory location as to where other source code, API's and the like, that may be referenced within the user source code statements may be stored. For example, foo.c may make an API call and other source files used in connection with this API call (such as C language header files containing API definitions) may be located in a directory identified by CSX_INFRA. CSX_INFRA may have a default value specified in LIB_PROLOGUE such as: CSX_INFRA=<default directory location>. Statements of the body 614 may then reference CSX_INFRA as desired. The prologue make file may include the necessary conditional logic to handle processing for the different possible targets for this library use case.

The epilogue make file, LIB_EPILOGUE in this example, may contain any definitions, rules, or other logic necessary to compile, link, and otherwise generate and process the specified objects. For example, the epilogue may reference previous definitions for variables identifying the directory location of the source files and object files, identifying compiler command line flags or options, and the like. The epilogue may include the logic and rules for forming the compilation command line based on these and other variables. An example is described in more detail below.

Figure 7:
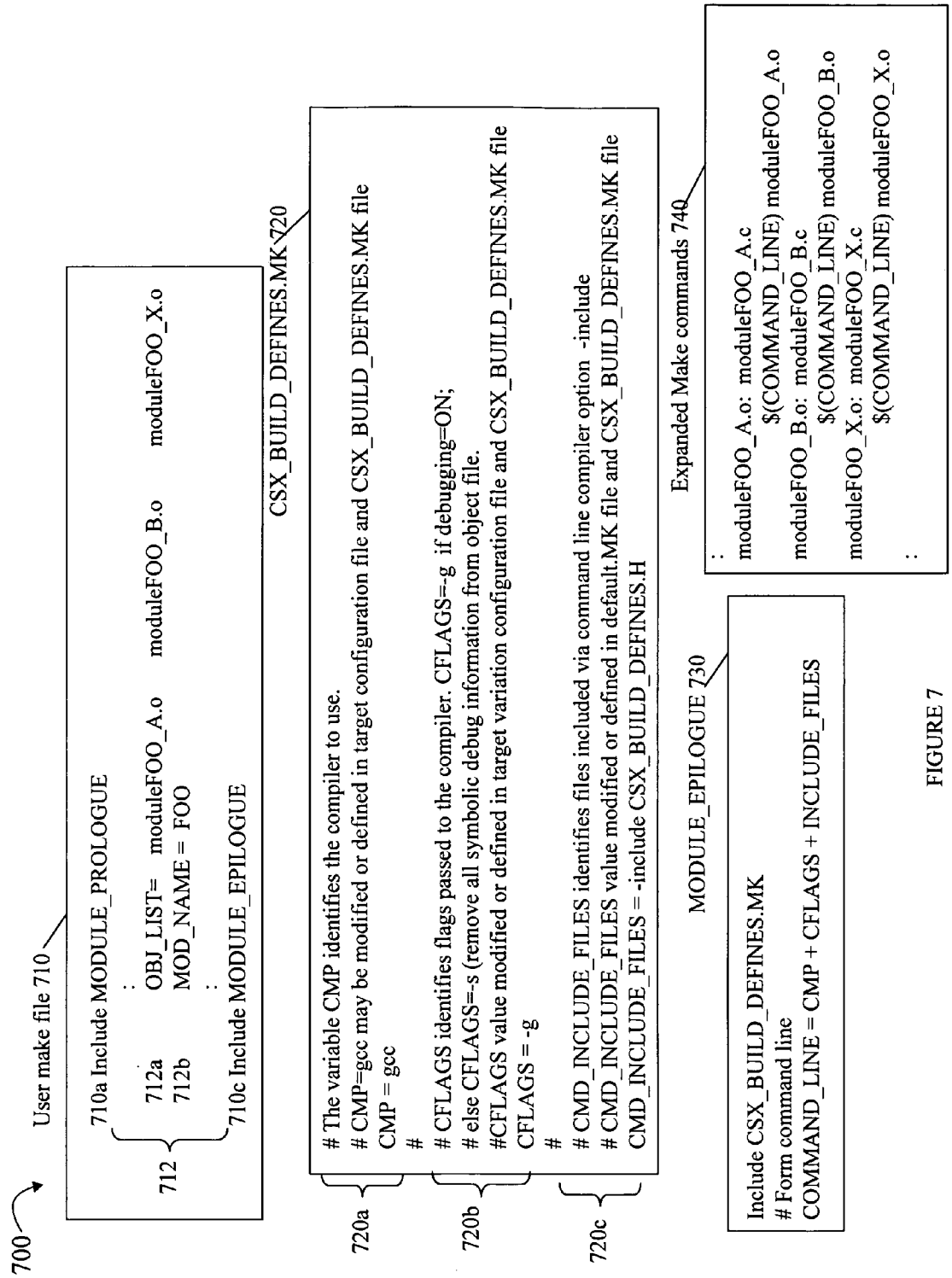
FIG. 7 is a more detailed example of files that may be used in an embodiment in accordance with techniques herein.

Referring to FIG. 7, shown is another example of files that may be used in connection with techniques herein. The example 700 includes a user make file 710 referencing a make infrastructure prologue file (710*a*) and epilogue file (710*b*) and including a user-specified body 712. In this example, the build generated output may correspond to a module such as in accordance with a target and target variant for the module described in the U.S. patent application Ser. No. 12/456,835. The body 712 may include a statement 712*a* identifying a list of objects to be compiled in connection with the module. The statement 712*b* may identify the name of the module, FOO, generated based on the objects in the OBJ_LIST from 712*a* Statement 712*a* may also imply a dependency of the module FOO on the specified objects. It should be noted that the MOD_NAME and OBJ_LIST may reference reserved or predefined names of the build system. In accordance with 712*b*, any change to FOO_A.o, FOO_B.o or FOO_X.o (object files) triggers a rebuild of module FOO. Although not illustrated in 712, each of the object files of 712*a* may be dependent on a C language source file which is compiled to generate a corresponding object file of 712*a*. The body 712 may also include statements identifying the foregoing C-language source files and/or other make file statements besides those illustrated in FIG. 7.

Also included in FIG. 7 is an example of a generated build file, the make file CSX_BUILD_ DEFINES.MK 720, as may be generated by the build component of FIG. 3 after processing target and target variant configuration files. As illustrated with 720*a*, the target configuration file may include a make file information section (e.g., such as with mdefs and/or mvars) including a reference to a predefined or reserved name, CMP, which defines the compiler name to be used when invoking the C language compiler on a command line. The build component may recognize the reference to this predefined or reserved name, extract this definition from the target configuration file, and include it in the build generated make file 720.

As illustrated with 720*b*, the target variation configuration file may include a make file information section (e.g., such as with mdefs and/or mvars) with a reference to a predefined or reserved name, CFLAGS, which defines the flags to be used in connection with compilation command lines when invoking the C language compiler. The debug target variant may specify that CFLAGS=-g to cause compilation to generate debug symbol information. The retail or production target variant may alternately specify that CFLAGS=-s causing compilation to result in removal of all symbolic debug information from the object file. The build component may recognize the reference to this predefined or reserved name, extract this definition from the target variant configuration file, and include it in the build generated make file 720.

As illustrated with 720*c*, the default configuration file may include a make file information section (e.g., such as with mdefs and/or mvars) including a reference to a predefined or reserved name, CMD_INCLUDE_FILES, which identifies files to be included using a command line compiler option "-include" causing the identified files to be included as an input to the compilation process. The foregoing option may be used to force or specifically require that certain files may processed as a compilation input. The build component may recognize the reference to this predefined or reserved name CMD_INCLUDE_FILES, extract this definition from the default configuration file, and include it in the build generated make file 720. It should be noted that the include file references the build generated .H file, CSX_BUILD_ DEFINES.H causing the build generated .H file to be included as an input to each C language compilation.

The module_epilogue 730 includes the statement(s) and rule(s) to form the compilation command line based on previously defined variables CMP, CFLAGS and INCLUDE_FILES (e.g., a concatenation of the foregoing). The user make file 710 includes the epilogue file 730 which, in turn, comprises an include statement referencing CSX_ BUILD_DEFINES.MK 720. The epilogue and/or other make infrastructure files may also include macros and other logic capable of generating the make commands and rules necessary to compile the source files for moduleFOO_A.c, moduleFOO_B.c and moduleFOO_X.c as illustrated by element 740. Each of the compilation command lines of 740 may reference the compilation command line (e.g., COM-MAND_LINE) formed and specified in the epilogue 730. The make commands of 740 may be processed along with other commands by the make system in order to generate the necessary objects and final output or code entity that may vary with target. With reference to the example illustrated in 700, the expanded make commands 740 may also include the commands and rules necessary to compile the source code files generating object files and to link the generated object files into the single module, FOO.

An embodiment may invoke the make system using a command line such as: make <user make file> wherein <user make file> identifies, for example, the user provided make file 710 of FIG. 7 defined in accordance with a make file template or format for a particular use. It should be noted that an embodiment may define other use cases, associated logical entities, and associated code entities generated by the build system than as mentioned herein. For example, the output or code entity generated by the build system may be, for example, an executable file such as a .EXE file, a message catalogue, and others as described herein as known in the art.

In connection with FIG. 7, it should be noted that an embodiment may implement the functionality such as provided by 740 in a variety of different ways. For example, an embodiment may generate one or more temporary make files including make file statements to implement the logic of 740. An embodiment may alternatively specify rules which provide for automated generation of make file statements of 740 (or the equivalent thereof) where such statements may not actually be stored in a temporary file. Rather, the make system may generate such statements or the equivalent internally based on rules provided as input to the make system.

Figure 8:
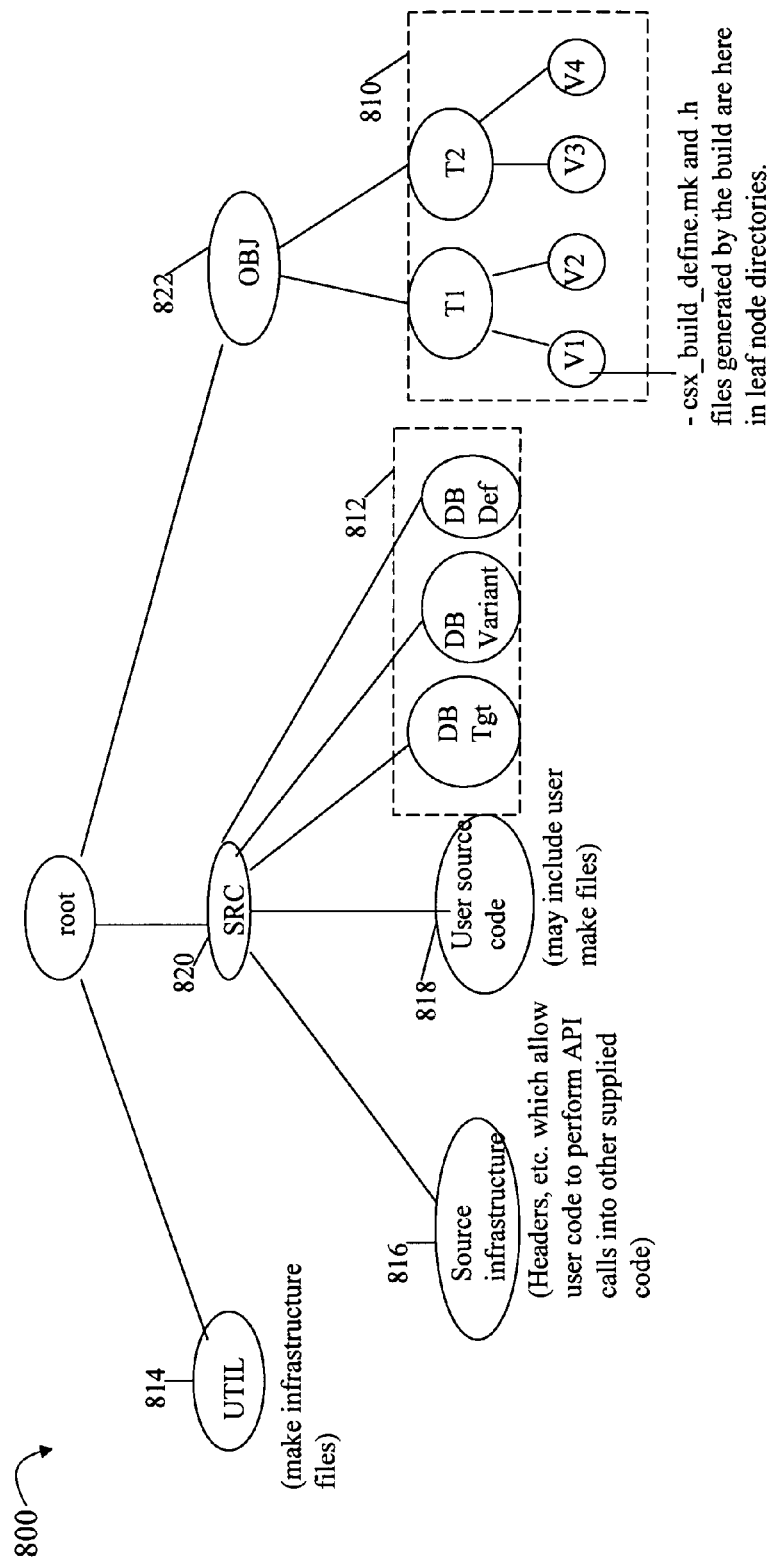
FIG. 8 is an example illustration of a directory structure that may be used in connection with the techniques herein.

Referring to FIG. 8, shown is an example of a directory structure of files that may be used in connection with techniques herein. It should be noted that a particular directory structure such as illustrated in the example 800 may be presumed. Such presumptions regarding the directory structure and location of source files, and the like, used in connection with techniques herein may be overridden or redefined such as using predefined or reserved names recognized by the build component as described herein. In the example 800, a root directory (root) may have subdirectories UTIL 814, SRC 820 and OBJ 822. The UTIL (utilities) subdirectory 814 (and possibly other child or subdirectories of UTIL) may include files of the build system such as the make infrastructure files (e.g. epilogue and prologue make files), scripts comprising the build component, compiler and other tools of the build system. The SRC subdirectory 820 may further include a source infrastructure subdirectory 816, a user source code subdirectory 818, and a plurality of subdirectories 812 including configuration files of the configuration database. The source infrastructure subdirectory 816 may include other files of the CSE as described herein that may be used by the user source code. For example, the user source code may perform API calls of the CSE where the appropriate .H file (e.g., C language header file) defining the APIs are included in 816. Element 818 identifies the subdirectory containing user supplied code such as the user make file (e.g., as input to the make system in the second phase of FIG. 3) and user source code (e.g., as input to the compiler in the third phase of FIG. 3). It should be noted that element 818 may be a subdirectory containing other descendant subdirectories forming a subdirectory hierarchical structure with 818 as the root thereof containing user provided source and/or make files. For example, element 818 may represent a user-defined directory structure where 818 denoted a root and has one or more child subdirectories, and each such child may include one or more other subdirectories at one or more other levels. An embodiment may allow a user to specify in a user-provided make file (such as via setting a reserved or predefined name known to the make system) an ordering in which the subdirectory tree formed with root 818 is traversed in connection with build system processing described herein.

Element 812 is an example where the configuration files of the configuration database, or more generally configuration data store, are included in a portion of the file system. In this example, a first directory DBTgt includes a target configuration file for each possible target, a second directory DBVariant includes a target variant configuration file for each possible target variant, and a third directory DBDef includes one or more default files that may be used for multiple target-target variant combinations. The SRC directory 820 (and any subdirectories thereof) may be read-only.

The intermediate and other outputs generated by the build system in accordance with techniques herein may be stored in the OBJ directory 822. In this example, 822 may include a plurality of subdirectories having a level of child subdirectories, one for each possible target. Each child subdirectory corresponding to a target may then include one or more other subdirectories for possible target variants thereof. In this example 810, there may be two targets T1 and T2. Each of the foregoing targets T1 and T2 may have two possible variants—T1 may have variants V1 and V2 and T2 may have variants V3 and V4. Each leaf node of 810 may be associated with a particular target-target variant combination and identifies the subdirectory location where the build system places temporary, intermediate and final outputs for the particular target-target variant. For example, the leaf node directories of 810 may include the build generated make and .H files (e.g., CSX_BUILD_DEFINES.MK and CSX_BUILD_DEFINES.H files), object files, and final output (346 of FIG. 3). An embodiment may allow a user to redefine or override predefined variables pointing to one or more of the foregoing directories in order to allow, for example, for user source files to be retrieved from another location, for generated output to be stored in a different location, and the like.

The directories of 812 may be populated with configuration files prior to invoking the build system of FIG. 3.

It should be noted that an embodiment in accordance with techniques herein may provide one or more different variations in connection with identifying the host or other location upon which the build processing is performed. For example, if a remote host is identified such as in the bdefs sections of a configuration file, an embodiment may choose to copy the source and other necessary files to the remote location, perform the build processing, and then copy the results back to the local host. Alternatively, an embodiment may elect not to mirror or copy the files from a first location to the remote location and rather perform the build remotely while accessing the source and other files on the first location. It should be noted that an embodiment may include reserved or predefined names that a user can specify in one of the configuration file sections in order to identify and/or enable the foregoing options.

Described above are examples of different types of information that may be communicated to the build component, make system, and other software tools (such as compilers, linkers and the like), in connection with build processing. An embodiment may more generally parameterize any such information (e.g., such as using the predefined or reserved variables or other names in the mdefs, mvars, cdefs and/or bdefs configuration file sections) for any phase in the build system processing and allow the user to specify values for such defined parameters known or recognized by the build system in one or more configuration files. The techniques above also provide a way for user-specified information to be communicated to the make system, user make files, user source code, and other software tools. Such information may, for example, be included in the mdefs and cdefs section of the configuration files using variables and names other than those which are predefined or reserved and recognized by the build system has having particular semantic meaning. For example, if name-value pairs specified in the cdefs and/or mdefs sections are not recognized as imparting any special semantic meaning by the build system, such cdef statements including the name-value pairs may be passed on "as is" in the build generated .H file. Also such mdef statements may be passed on "as is" to the make system in the build generated make file. Generally, information in the make file information section (e.g., such as specified in the mdef and mvars section statements) is visible to the user make file and other make files as supplied with the build system (e.g., the make infrastructure).

It should be noted that the particular tools used in connection with generating output for a particular target may vary. Another system or service may also be used in connection with the build system described herein generating the output for the desired target. For example, when building a Windows-based kernel module or Linux-based kernel module, particular software tools in addition to a compiler and/or linker may need to be utilized. Logic may be encoded in the build component and/or make files supplied as part of the build system (e.g., make infrastructure) to generate appropriate information which is used as an input when invoking/spawning yet another tool/system. For example, consider the case where a user wants to build module XYZ based on 3 objects S1.O, S2.O and S3.O where XYZ is a Windows-based kernel module. The build system as described herein knows how to invoke the appropriate compiler of a specified tool chain to build the foregoing 3 object files. In this example, there may exist another system or other tools which are invoked by the make system. The build component may generate other necessary make files invoking any additional tools. Such make files may be required, for example, to have particular names and formats in order to be used with particular tools. For example, a system defined tool such as Build.exe from the Windows DDK may be invoked to build a Windows kernel module that is a driver. The foregoing tool make require the make files to have particular names. Such make files may be generated by the build component and/or using make infrastructure code. With reference to FIG. 8, an embodiment of the build system herein may store such generated make files and other output generated by the build system process in appropriate locations in the OBJ directory structure (e.g., in the appropriate leaf directory of 810 or other location).

As described herein, a target may be defined based on a combination of hardware and/or software platforms and environment upon which the resulting build output is executed. As one example, a specified target may vary with the following: user space or type of kernel, toolchain, operating system (OS), processor type, and number of processors. Based on this, an example target specification may include:

"Kernel_toolchain_OS_processortype_#processors"
where where kernel identifies a type or version of a kernel, or may otherwise designates user (for U-space);
toolchain identifies a particular tool set (e.g., GNU);
processortype identifies a type of CPU (e.g., type of Intel-based processor such as X86); and
processors identifies a number of processors of the target (e.g., uniprocessor or multiprocessor (MP) architecture).

An embodiment may identify a target by concatenating elements identifying each of the foregoing for the target (e.g., LX26_GNU_CS2_X86_MP).

As another example, a specified target may vary with the following OS, toolchain, and processor type. Based on this, an example target specification may include:
"OS_toolchain_processortype" where
OS identifies an operating system (e.g. WINXP for Windows XP, LINUX, and the like);
toolchain identifies the particular tool suite or tool set used (e.g., VS for Visual Studio); and
processortype identifies a type of CPU (e.g., type of Intel-based processor such as X86).

An embodiment may identify a target by concatenating elements identifying each of the foregoing for the target (e.g., WINXP_VS_X86 for a target with Windows XP, Visual Studio tool set; and the X86 Intel processor type).

In accordance with techniques herein, described are embodiments of a build system for building an output such as a code entity for multiple targets where such targets may vary with hardware and/or software platforms and also whether the output will executed in U-space, K-space or both. The techniques of the build system herein includes performing three build phases or stages for each combination of target and target variant in order to generate an output or code entity which varies with target and target variant. The resulting output or code entity may vary with target. As described herein, a library and module are logical usage concepts which may each result in generation of any one of a variety of different code entities depending on the target (e.g., the particular hardware and/or software platform and environment where the output will be utilized and whether the output will be executed in U or K space).

Figure 9:
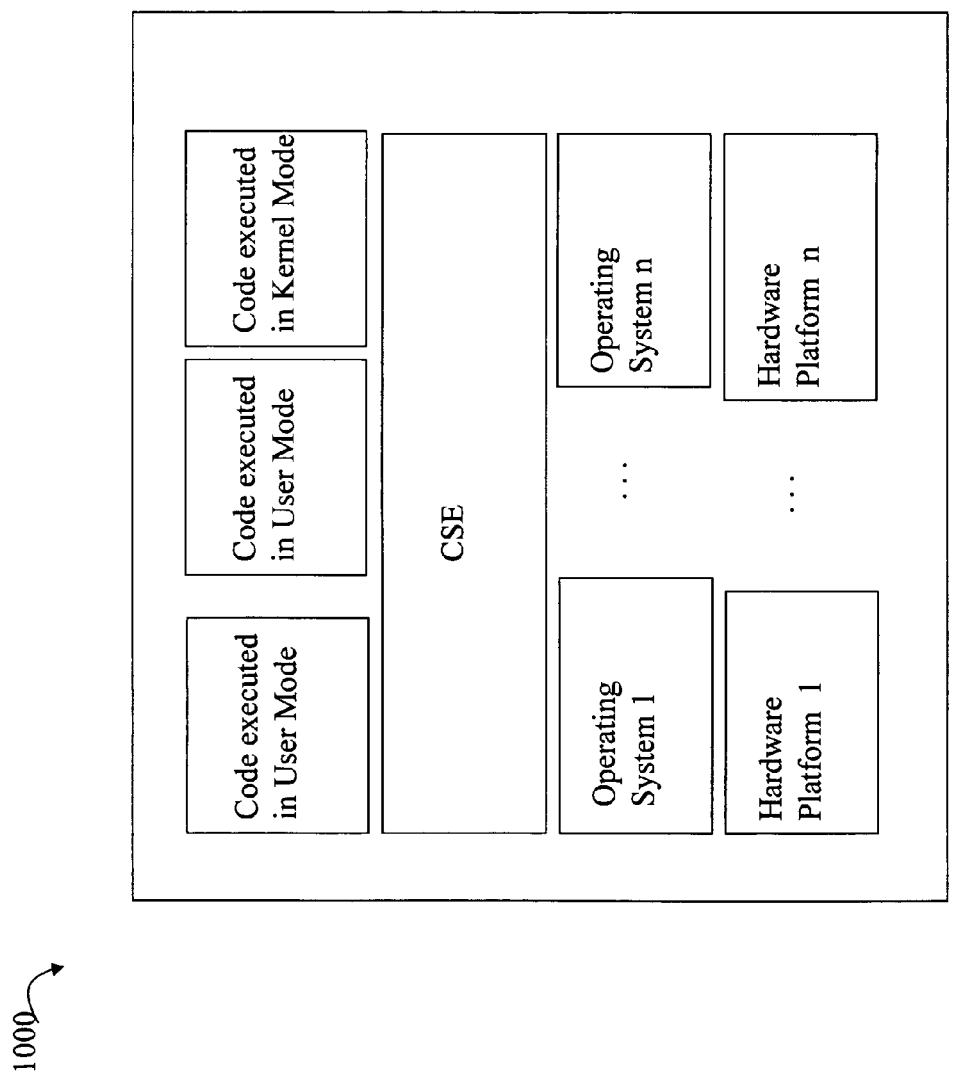
FIG. 9 is an illustration of the different operating systems and hardware platforms that may be included on a data storage system for use with the techniques herein.

Referring to FIG. 9, shown is a representation illustrating the relationship of the common software environment (CSE) components to other components of the data storage system. In the example 1000, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code writing using the API of the CSE may be executed in either user or kernel mode as illustrated herein. User provided source code may utilize code of the CSE (e.g., such as by using defined APIs) where the user provided source code may be built using the techniques herein to generate a resulting code entity for use on any one of a variety of different targets. As described above, the particular code entity generated as an output of the build system herein may vary for each different combination of target and target variation.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method for building a code entity comprising:
selecting a plurality of configuration files in accordance with a target and target variant of the code entity, said plurality of configuration files specifying configuration options including any of a compilation option used in at least one compiling operation in a third build phase and a linking option used in at least one linking operation in the third build phase, for different target and target variant combinations;

performing at least three build phases using the plurality of configuration files selected in said selecting, wherein each of the plurality of configuration files includes a section of information used in a second of the at least three build phases wherein the section of information of each of the plurality of configuration files includes one or more lines of definitions identifying any of the compilation option and the linking option, and said performing the at least three build phases further includes:

performing a first build phase that includes merging information from the plurality of configuration files and generating a first build file and a second build file, wherein the first build phase includes generating merged definitions by merging the one or more lines of definitions identifying any of the compilation option and the linking option from the section of information of each of the plurality of configuration files, the merged definitions being included in the first build file;

performing the second build phase using the first build file, wherein said second build phase includes dependency processing identifying a first set of one or more files that have been modified and a second set of one or more files dependent on any file of the first set, wherein said second build phase includes generating, in accordance with the merged definitions from the first build file and responsive to determining one or more modifications to the one or more files of the first set, one or more command lines for any of compiling in accordance with the compilation option and linking in accordance with the linking option one or more files from the first set to generate one or more files of the second set; and performing the third build phase using the second build file, the third build phase including generating each file of the second set dependent on a modified file of the first set, wherein the second build phase invokes any of a compiler and linker in the third build phase responsive to each modification of a file of the first set identified in the dependency processing of the second build phase, said any of a compiler and linker being invoked in the third build phase by executing the one or more command lines generated by the second build phase; and generating the code entity as an output of the at least three build phases, the code entity including executable code and varying with the target and target variant, wherein the code entity is any of a library and an executable code module.

2. The method of claim 1, wherein said plurality of configuration files includes a first configuration file specifying target specific build configuration options for the target and a second configuration file specifying target variant specific build configuration options for the target variant.

3. The method of claim 2, wherein the plurality of configuration files includes a third configuration file that is a default configuration file specifying default build configuration options for a plurality of different combinations of targets and target variants where each such combination is identified by a unique pairing of target and target variant.

4. The method of claim 3, wherein the default configuration file includes a first build configuration option and said target configuration file includes a second build configuration option overriding the first build configuration option.

5. The method of claim 2, wherein the target variant is one of a plurality of target variants, said plurality of target variants including a debug variant where the code entity for the target is used for debugging on the target and includes one or more debugging options enabled, and a production variant where the code entity for the target is a non-debug variant executed on the target and includes the one or more debugging options disabled.

6. The method of claim 2, wherein the second build phase uses a make system including a utility which processes statements specifying how to derive an element from each of its dependencies.

7. The method of claim 2, wherein the second build phase processes statements specifying how to derive an object file from one or more source code files.

8. The method of claim 7, wherein the second build phase processes statements specifying how to compile the one or more source code files to generate the object file and how to link one or more object files to generate an executable file.

9. The method of claim 2, wherein said third build phase is invoked by the second build phase.

10. The method of claim 9, wherein the third build phase includes compiling one or more source files into one or more corresponding object files and the second build file includes statements used by a compiler during said compiling.

11. The method of claim 10, wherein the first build file includes first information identifying one or more dependencies between at least two files and includes a definition identifying a compiler or a compilation option used in compiling in the third build phase.

12. The method of claim 9, wherein the first build file and the second build file each include a portion of information as included in at least one of the first configuration file for the target and the second configuration file for the target variant.

13. The method of claim 9, wherein the first build file and the second build file each include a portion of information that is derived information determined by the first build phase.

14. The method of claim 1, wherein the target varies with whether the code entity is configured for execution in user space or kernel space.

15. The method of claim 1, wherein a same set of user files is used in generating code entities for a plurality of different targets, the same set of user files including one or more source files and one or more other files indicating dependencies, said one or more other files having predefined format.

16. The method of claim 1, wherein said target identifies a combination of a hardware and a software platform upon which the code entity, that is generated as an output of said method, executes, and wherein said target variant identifies a software build variation for a particular target.

17. A non-transitory computer readable medium comprising executable code stored thereon that when executed by a processor, performs a method of building a code entity comprising:

selecting a plurality of configuration files in accordance with a target and target variant of the code entity, said plurality of configuration files specifying configuration options including any of a compilation option used in at least one compiling operation in a third build phase and a linking option used in at least one linking operation in the third build phase, for different target and target variant combinations;

performing at least three build phases using the plurality of configuration files selected in said selecting, wherein each of the plurality of configuration files includes a section of information used in a second of the at least three build phases wherein the section of information of each of the plurality of configuration files includes one or more lines of definitions identifying any of the compilation option and the linking option, and said performing the at least three build phases further includes:

performing a first build phase that includes merging information from the plurality of configuration files and generating a first build file and a second build file, wherein the first build phase includes generating merged definitions by merging the one or more lines of definitions identifying any of the compilation option and the linking option from the section of information of each of the plurality of configuration files, the merged definitions being included in the first build file;

performing the second build phase using the first build file, wherein said second build phase includes dependency processing identifying a first set of one or more files that have been modified and a second set of one or more files dependent on any file of the first set, wherein said second build phase includes generating, in accordance with the merged definitions from the first build file and responsive to determining one or more modifications to the one or more files of the first set, one or more command lines for any of compiling in accordance with the compilation option and linking in accordance with the linking option one or more files from the first set to generate one or more files of the second set; and performing the third build phase using the second build file, the third build phase including generating each file of the second set dependent on a modified file of the first set, wherein the second build phase invokes any of a compiler and linker in the third build phase responsive to each modification of a file of the first set identified in the dependency processing of the second build phase, said any of a compiler and linker being invoked in the third build phase by executing the one or more command lines generated by the second build phase; and generating the code entity as an output of the at least three build phases, the code entity including executable code and varying with the target and target variant, wherein the code entity is any of a library and an executable code module.

18. The non-transitory computer readable medium of claim 17, wherein said plurality of configuration files includes a first configuration file specifying target specific build configuration options for the target and a second configuration file specifying target variant specific build configuration options for the target variant.

19. A system comprising;
at least one processor; and
a non-transitory computer readable medium with executable code stored thereon for building a code entity that, when executed by the at least one processor, performs a method comprising:

selecting a plurality of configuration files in accordance with a target and target variant of the code entity, said plurality of configuration files specifying configuration options including any of a compilation option used in at least one compiling operation in a third build phase and a linking option used in at least one linking operation in the third build phase, for different target and target variant combinations;

performing at least three build phases using the plurality of configuration files selected in said selecting, wherein each of the plurality of configuration files includes a section of information used in a second of the at least three build phases wherein the section of information of each of the plurality of configuration files includes one or more lines of definitions identifying any of the compilation option and the linking option, and said performing the at least three build phases further includes:

performing a first build phase that includes merging information from the plurality of configuration files and generating a first build file and a second build file, wherein the first build phase includes generating merged definitions by merging the one or more lines of definitions identifying any of the compilation option and the linking option from the section of information of each of the plurality of configuration files, the merged definitions being included in the first build file;

performing the second build phase using the first build file, wherein said second build phase includes dependency processing identifying a first set of one or more files that have been modified and a second set of one or more files dependent on any file of the first set, wherein said second build phase includes generating, in accordance with the merged definitions from the first build file and responsive to determining one or more modifications to the one or more files of the first set, one or more command lines for any of compiling in accordance with the compilation option and linking in accordance with the linking option one or more files from the first set to generate one or more files of the second set; and performing the third build phase using the second build file, the third build phase including generating each file of the second set dependent on a modified file of the first set, wherein the second build phase invokes any of a compiler and linker in the third build phase responsive to each modification of a file of the first set identified in the dependency processing of the second build phase, said any of a compiler and linker being invoked in the third build phase by executing the one or more command lines generated by the second build phase; and generating the code entity as an output of the at least three build phases, the code entity including executable code and varying with the target and target variant, wherein the code entity is any of a library and an executable code module.

* * * * *